US012779576B2

(12) United States Patent
Engel et al.

(10) Patent No.: US 12,779,576 B2
(45) Date of Patent: Nov. 3, 2026

(54) TRIGGER FOR TORCH

(71) Applicant: The ESAB Group, Inc., North Bethesda, MD (US)

(72) Inventors: Mike Engel, Giessen (DE); Stefan Suess, Nieder-Wiesen (DE); Marc A. Hartel, Reiskirchen (DE)

(73) Assignee: THE ESAB GROUP, INC., North Bethesda, MD (US)

( * ) Notice: Subject to any disclaimer, the term of this patent is extended or adjusted under 35 U.S.C. 154(b) by 847 days.

(21) Appl. No.: 18/295,937

(22) Filed: Apr. 5, 2023

(65) Prior Publication Data

US 2024/0335898 A1 Oct. 10, 2024

(51) Int. Cl.
*B23K 9/32* (2006.01)
*B23K 9/28* (2006.01)

(52) U.S. Cl.
CPC .................. *B23K 9/32* (2013.01); *B23K 9/28* (2013.01)

(58) Field of Classification Search
CPC ........... B23K 9/28; B23K 9/32; H05H 1/3489
See application file for complete search history.

(56) References Cited

U.S. PATENT DOCUMENTS

| | | | | |
|---|---|---|---|---|
| 4,523,498 A | | 6/1985 | Chapman, Jr. | |
| 5,597,497 A | | 1/1997 | Dean et al. | |
| 5,698,122 A | * | 12/1997 | Lubienіecki ............. | B23K 9/32 219/137.31 |
| 6,367,465 B1 | | 4/2002 | Buccieri, Jr. | |
| 6,979,799 B2 | | 12/2005 | Centner | |
| 8,952,294 B2 | | 2/2015 | Serio | |
| 9,199,329 B2 | | 12/2015 | Kettunen | |
| 9,375,832 B2 | | 6/2016 | Boeck et al. | |
| 9,486,874 B2 | | 11/2016 | Giese | |
| 9,550,250 B2 | | 1/2017 | Upton | |
| 9,795,435 B2 | | 10/2017 | Allen, IV et al. | |
| 9,918,779 B2 | | 3/2018 | Krastins et al. | |
| 9,918,780 B2 | | 3/2018 | Allen, IV et al. | |
| 9,918,781 B2 | | 3/2018 | Krastins et al. | |
| 10,081,072 B2 | | 9/2018 | Garvey et al. | |
| 10,624,662 B2 | | 4/2020 | Allen, IV et al. | |

(Continued)

FOREIGN PATENT DOCUMENTS

| | | | |
|---|---|---|---|
| CN | 209550862 | U | 10/2019 |
| WO | 9600140 | A1 | 1/1996 |

OTHER PUBLICATIONS

Notification of Transmittal of International Search Report and Written Opinion, including International Search Report and Written Opinion for International Patent Application No. PCT/US2024/022999, mailed Aug. 1, 2024, 15 pages.

*Primary Examiner* — Michael Leslie
(74) *Attorney, Agent, or Firm* — Edell, Shapiro & Finnan, LLC

(57) ABSTRACT

A torch for an arc process operation includes a handle and a trigger coupled to the handle. The trigger includes a base segment configured to rotate relative to the handle via a pivot, as well as an extended segment coupled to the base segment. The extended segment is configured to move relative to the base segment to transition the trigger between an extended configuration and a compact configuration, the extended segment extends away from the base segment in the extended configuration, and the extended segment extends along the base segment in the compact configuration.

20 Claims, 8 Drawing Sheets

(56) References Cited

U.S. PATENT DOCUMENTS

| | | | | |
|---|---|---|---|---|
| 10,828,084 | B2 | 11/2020 | Krastins et al. | |
| 12,256,483 | B2 * | 3/2025 | Hartel | H05H 1/36 |
| 2004/0020908 | A1 | 2/2004 | Centner | |
| 2010/0102037 | A1 | 4/2010 | Kettunen | |
| 2021/0022790 | A1 | 1/2021 | Krastins et al. | |
| 2021/0022791 | A1 | 1/2021 | Krastins et al. | |
| 2021/0069818 | A1 | 3/2021 | Martin et al. | |
| 2024/0123538 | A1 * | 4/2024 | Hartel | B23K 9/295 |

* cited by examiner

TRIGGER FOR TORCH

TECHNICAL FIELD

The present disclosure is directed toward field of torches and, in particular, a trigger for a torch.

BACKGROUND

Handheld arc processing torches (e.g., welding or cutting torches) include a handle and trigger for operating the torch. The trigger can be used to initiate, maintain, and/or terminate an arc processing operation (e.g., a welding operation or a cutting operation). That is, the trigger may be depressed to cause a desired processing operation to be performed. For example, actuation of the trigger may cause process/shield gas and/or current to flow from a power supply to a torch, and/or cause weld wire to flow from a wire feeder to a torch. The trigger may also initiate other operations related to arc process operations.

SUMMARY

Techniques for a torch with a trigger are presented herein. These techniques may be embodied as one or more methods, one or more apparatuses, and/or one or more systems.

In accordance with at least one embodiment, a torch for an arc process operation includes a handle and a trigger coupled to the handle. The trigger includes a base segment configured to rotate relative to the handle via a pivot, as well as an extended segment coupled to the base segment. The extended segment is configured to move relative to the base segment to transition the trigger between an extended configuration and a compact configuration, the extended segment extends away from the base segment in the extended configuration, and the extended segment extends along the base segment in the compact configuration.

In accordance with one or more further embodiments, a trigger for an arc process torch includes a first segment configured to rotate relative to a handle of the arc process torch and a second segment coupled to the first segment and configured to move relative to the first segment. The second segment is configured to extend along the first segment in a first configuration of the trigger, and the second segment is configured to extend away from the first segment in a second configuration of the trigger.

In accordance with yet another embodiment a handheld tool configured to perform a processing operation includes a handle and a trigger coupled to the handle. The handheld tool includes a first segment and a second segment configured to rotate relative to one another. The first segment and the second segment extend along one another in a first configuration of the trigger, the first segment and the second segment extend away from one another in a second configuration of the trigger, and actuation of the trigger causes the handheld tool to perform the processing operation.

BRIEF DESCRIPTION OF THE DRAWINGS

To complete the description and in order to provide for a better understanding of the present disclosure, a set of drawings is provided. The drawings form an integral part of the description and illustrate an embodiment of the present disclosure, which should not be interpreted as restricting the scope of the disclosure, but just as an example of how the disclosure can be carried out. The drawings include the following figures.

Like reference numerals have been used to identify like elements throughout this disclosure.

DETAILED DESCRIPTION

Figure 1:
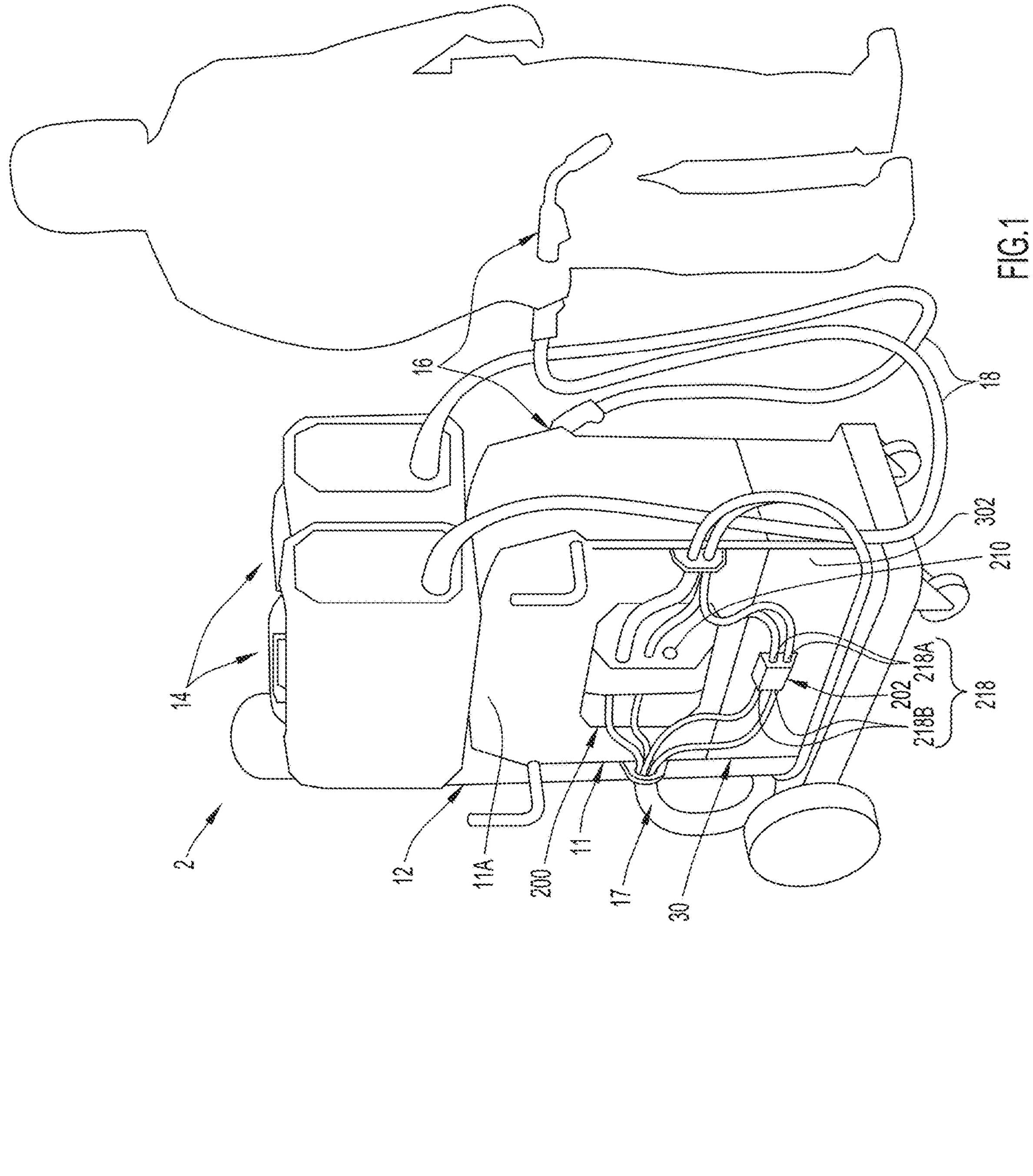
FIG. 1 is a perspective view of a welding system, according to one or more embodiments.

The following description is not to be taken in a limiting sense but is given solely for the purpose of describing the broad principles of the disclosure. Embodiments of the disclosure will be described by way of example, with reference to the above-mentioned drawings showing elements and results according to the present disclosure.

Generally, the present application is directed to a torch (e.g., a cutting torch, a welding torch) with a trigger. The trigger may be actuated by a user to control operation of the torch, such as to initiate, maintain, and/or terminate an arc process (e.g., a hot work) operation. For example, the trigger may be coupled to a handle of the torch. The user may grip the handle and depress the trigger toward or into the handle to actuate the trigger.

In some circumstances, different specifications of the trigger may be preferred. As an example, a user may prefer to hold the torch or operate the trigger in different manners, such as based on an operation (e.g., a duration of an operation). For instance, a user may desire to position their hand differently with respect to the trigger, such as to change a number of fingers that are in contact with the trigger to actuate the trigger.

Accordingly, embodiments discussed herein are directed to a torch with a trigger that is adjustable between a compact configuration and an extended configuration. The trigger may extend in different manners with respect to the handle in the different configurations. For example, the trigger may include a base segment coupled to and extending from the handle, as well as an extended segment coupled to the base segment. In the compact configuration, the extended segment may extend along the base segment. In the extended configuration, the extended segment may extend away from the base segment. Thus, the trigger may extend farther away from the handle in the extended configuration than in the compact configuration. The different extensions of the trigger may accommodate different hand (e.g., finger) positions to provide a comfortable arrangement of components to control operation of the torch. In other words, the trigger may be adjusted between the different configurations to facilitate actuation of the trigger at different hand positions (e.g., for different users, for different arc process operations) on the handle. As such, the trigger may provide greater adjustability to enable a user to operate the torch more comfortably. Although the present disclosure primarily focuses on welding implementations, the features presented herein can be applied to other arc processing operations, such as plasma cutting operations, and/or for components used in other contexts (e.g., fluid spray operations). Moreover, although the disclosed trigger is discussed with respect to torches, the trigger may be implemented in another suitable handheld tool or device that performs a processing operation, such as a power drill that performs a drilling operation or a sprayer that performs a spraying operation, upon actuation of the trigger.

With the preceding in mind, FIG. 1 is a perspective view of an embodiment of a welding system 2. The welding system 2 includes a power supply 11, wire feeders 14, and a cooling component/cabinet 30 disposed on a cart 12. The welding system 2 also includes torches 16 (e.g., welding torches). The torches 16 are connected to the wire feeders 14 via torch cables 18. During operation of the welding system 2, the wire feeders 14 provide a wire to at least one of the torches 16. The power supply 11 charges the wires to strike an arc between the electrically charged wire and a metal work piece to melt the wire and fuse the wire onto the metal work piece. To effectuate this, each torch 16 includes a trigger, and a user can actuate the trigger to cause one of the torches 16 to electrically charge the wire and/or feed the wire toward the metal work piece. But, to reiterate, while the torches 16 utilize a fed wire in the illustrated embodiment, in additional or alternative embodiments, torches implementing the techniques presented herein need not utilize a wire. For example, the torches 16 can be tungsten inert gas (TIG) torches that strike an arc (e.g., via an electrically charged electrode), and transfer this arc to a separate component (e.g., a filler rod) to weld a metal work piece via the arc. As another example, the torches 16 could be plasma torches. In such examples, the wire feeders 14 and/or the cooling component 30 might not be included in the system 2.

The welding system 2 also includes connector assemblies 200, 202 disposed on a side panel 302 of the power supply 11. One or more cables 17 engage the connector assemblies 200 and 202 to electrically and/or fluidly connect the power supply 11 to the wire feeders 14, the cooling cabinet 30 to the wire feeders 14, and/or the power supply 11 to the cooling cabinet 30. As an example, the power supply 11 is configured to supply current and/or control signals to the wire feeders 14 and/or to the cooling cabinet 30. The cables 17 may also electrically couple to the power supply 11, the wire feeders 14, and/or the cooling cabinet 30 via sockets 210 of the connector assembly 200. Thus, the process current and/or control signals may be conducted from the power supply 11 via the connector assembly 200 and the cables 17 to the wire feeders 14 and/or to the cooling cabinet 30. Still further, in at least some instances, the cables 17 fluidly couple to the cooling cabinet 30 and/or the power supply 11 via sockets 218 of the connector assembly 202. Thus, cooling fluid may flow from the cooling cabinet 30, through the cables 17 via the connector assembly 202, and to the wire feeders 14 and/or to the power supply 11. The cooling fluid may also flow from the wire feeder 14 and/or from the power supply 11 to the connector assembly 202 via the cables 17. To this end, the connector assembly 202 may include supply sockets for supplying a flow cooling fluid and return sockets for receiving a return flow of the cooling fluid. In some implementations, front facing sockets 218A are the return sockets and rear facing sockets 218B are the supply sockets. In some implementations, the supply sockets include a front facing socket 218A and a rear facing socket 218B, and the return sockets include another front facing socket 218A and another rear facing socket 218B.

Figure 2A:
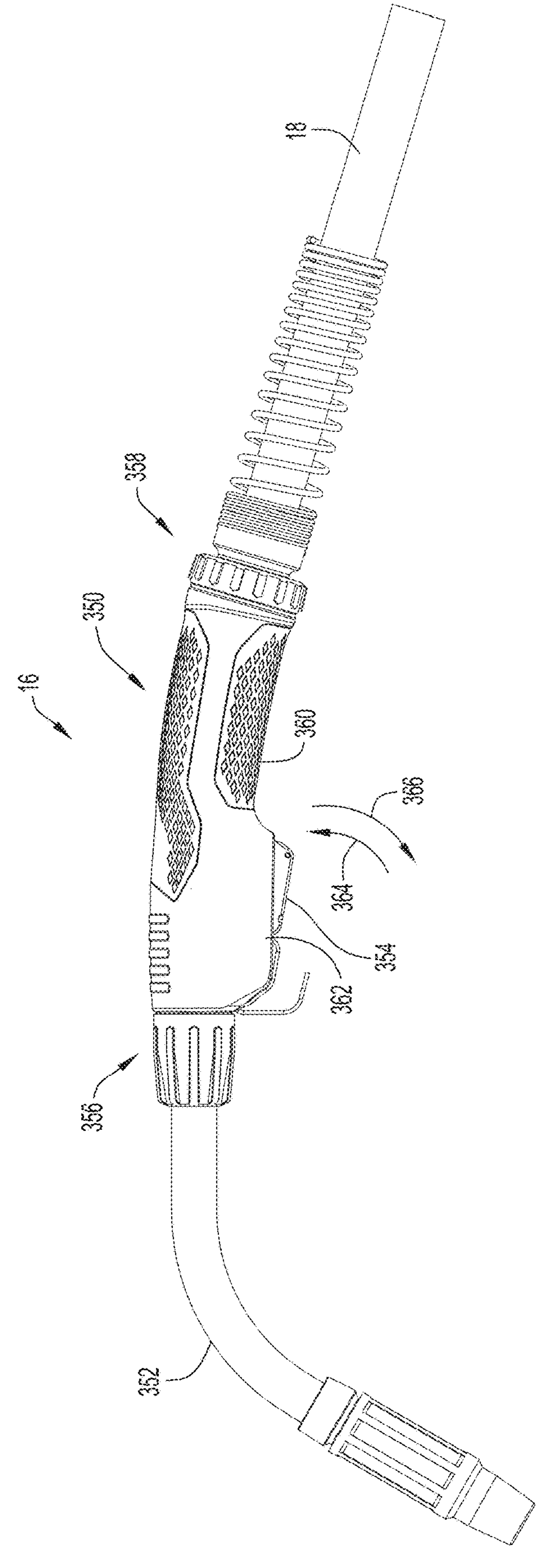
FIG. 2A is a side view of a torch with a trigger in a compact configuration, according to one or more embodiments.

FIG. 2A is a side view of the torch 16. The torch 16 includes a handle 350, a torch neck 352, and a trigger 354. However, in other embodiments, the torch 16 need not include a torch neck 352 (e.g., for TIG and plasma configurations). In any case, the handle 350 has a first end 356 (e.g., a distal end) and a second end 358 (e.g., a proximal end). The second end 358 of the torch 16 is connected to the torch cable 18 to electrically and/or fluidly couple the torch 16 to the power supply 11 and/or to the wire feeders 14. For example, during operation, wire may be directed through the torch 16, from the second end 358 toward the first end 356, through the torch neck 352, and out of the torch 16. The handle 350 also includes a grip portion 360, which defines the second end 358, and a base portion 362, which defines the first end 356, extending from the grip portion 360. The grip portion 360 has a generally cylindrical shape to enable a hand of a user to grip the handle 350 during operation of the torch 16. The trigger 354 is coupled to the base portion 362 and enables a user holding the grip portion 360 to access the trigger 354 in a comfortable manner. For instance, while the hand palm of the user is positioned on the grip portion 360, the user may extend a finger (e.g., an index finger) to reach and contact the trigger 354.

The user can actuate (e.g., depress the trigger 354 into or toward the handle 350) the trigger 354 to operate the torch 16. Actuation of the trigger 354, for example, causes the wire feeder 14 to provide the wire through the torch 16 and/or causes the power supply 11 to charge the wire. By way of example, the torch 16 may operate while the trigger 354 remains actuated, and operation of the torch 16 is suspended while the trigger 354 is not actuated. Additionally or alternatively, actuation of the trigger 354 adjusts operation of the torch 16, and the operation of the torch 16 is maintained until the trigger 354 is actuated again. For instance, a first actuation of the trigger 354 can initiate operation of the torch 16, and the torch 16 may continue to operate even while the trigger 354 does not remain actuated. Then, a second, subsequent actuation of the trigger 354 can suspend operation of the torch 16, and operation of the torch 16 may remain suspended until a third actuation of the trigger 354 occurs.

In certain embodiments, the trigger 354 is pivotably coupled to the base portion 362 to enable the trigger 354 to rotate relative to the base portion 362. For instance, the user can press or squeeze the trigger 354 to rotate the trigger 354 toward or into the base portion 362 in a first rotational direction 364 to actuate the trigger 354. When the user releases the trigger 354, the trigger 354 may rotate in a second rotational direction 366, opposite the first rotational direction 364, away or out of the base portion 362. For example, a biasing member (e.g., a spring) may impart a force onto the trigger 354 to bias the trigger 354 to rotate in the second rotational direction 366. In additional or alternative embodiments, the trigger 354 may be moved in a different manner, such as linearly along the handle 350, to cause actuation of the trigger 354.

In the illustrated embodiment, the trigger 354 is in a compact configuration. For example, the trigger 354 does not extend over a longitudinal dimension (e.g., front to back dimension) of the grip portion 360 in the compact configuration. As such, the user may reach their finger from the grip portion 360 over the base portion 362 to contact the trigger 354. For instance, the user may position their hand on the grip portion 360 and near the base portion 362 (e.g., more adjacent toward the first end 356) to be able to access the trigger 354. However, as discussed herein, the trigger 354 may be adjustable to change its position relative to the handle 350.

Figure 2B:
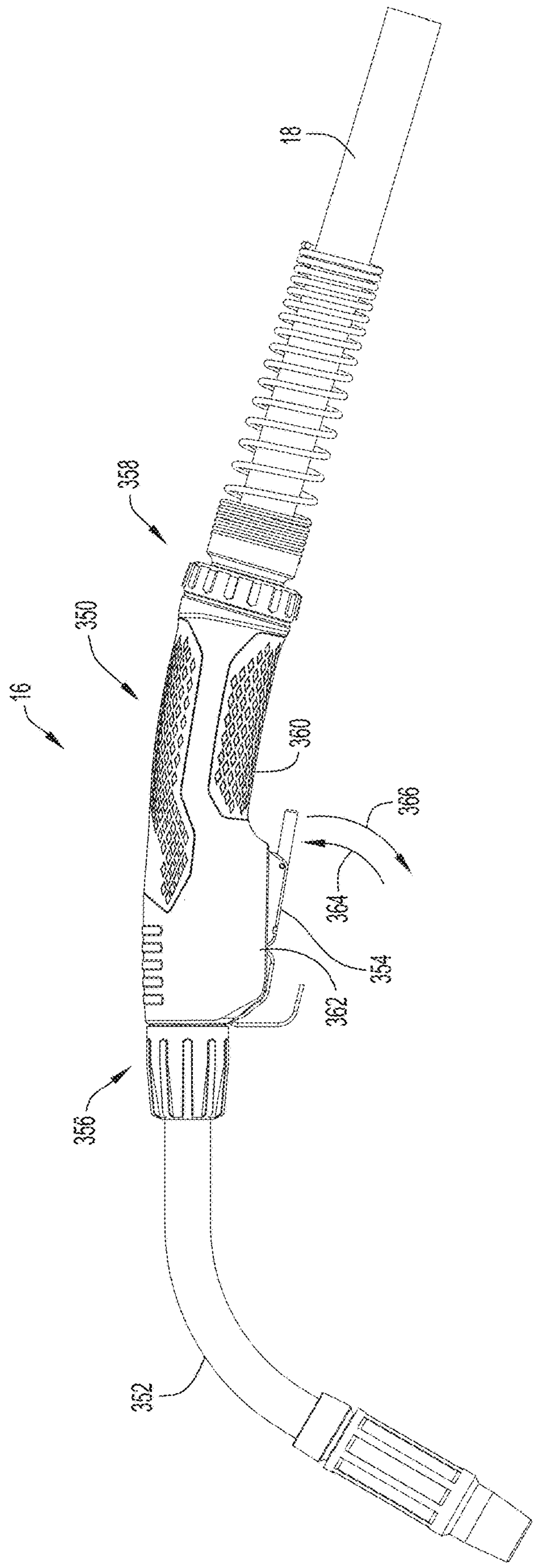
FIG. 2B is a side view of the torch of FIG. 2A with the trigger in an extended configuration, according to one or more embodiments.

FIG. 2B is a side view of the torch 16 in which the trigger 354 is in an extended configuration. In the extended configuration, a part of the trigger 354 extends past the longitudinal dimension of the grip portion 360. In other words, the trigger 354 is longer in its extended configuration than in its compact configuration and, thus, overlaps with the grip portion 360 in the extended configuration. Thus, the user may be able to contact the trigger 354 without reaching their finger over the base portion 362. As an example, the user may be able to access the trigger 354 while their hand is positioned on the grip portion 360 farther away from the base portion 362 (e.g., more adjacent toward the second end 358). Actuation of the trigger 354 remains generally the same in the compact configuration and in the extended configuration to operate the torch 16.

Figure 2C:
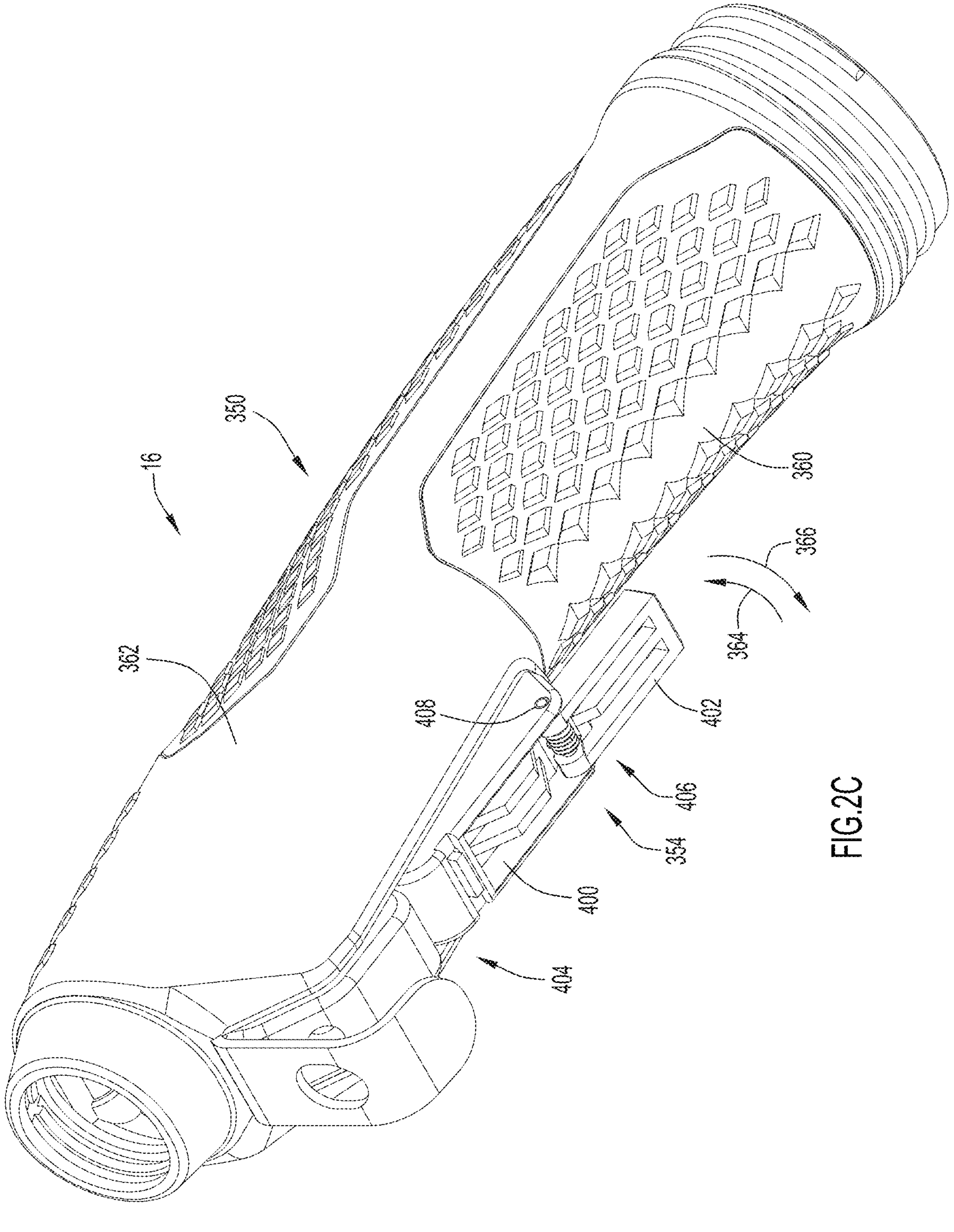
FIG. 2C is a perspective view of a handle and trigger of the torch of FIG. 2A, according to one or more embodiments.

FIG. 2C is a perspective view of a portion of the torch 16 providing additional details with respect to the handle 350 and the trigger 354. The trigger 354 is in the extended configuration in the illustrated embodiment. More specifically, in this embodiment, the trigger 354 includes a base segment 400 and an extended segment 402 coupled to the base segment 400. A first end 404 of the base segment 400 is coupled (e.g. pivotably coupled) to or inserted within the base portion 362 of the handle 350 and is pivotable or rotatable with respect to the base portion 362. That is, the base segment 400 can rotate or pivot about a connection between the first end 404 and the base portion 362. For instance, a user may impart a force onto the trigger 354 (e.g., at a location near a second end 406 of the base segment 400) toward the handle 350 to cause the base segment 400 to rotate in the first rotational direction 364 to actuate the trigger 354. Absent the force imparted onto the base segment 400, the base segment 400 may be biased to rotate in the second rotational direction 366 about the pivot, thereby moving the trigger 354 out of an actuation. In some embodiments, the base segment 400 may include a stop (not shown) that may block movement of the base segment 400 in the second rotational direction 366 beyond a certain amount away from the handle 350. Additionally or alternatively, the base segment 400 and/or the base portion 362 may include a stop that limits rotation of the base segment 400 in the first rotational direction 364.

The extended segment 402 is coupled to the second end 406 of the base segment 400 via a pivot 408 of the base segment 400. As such, the extended segment 402 may rotate relative to the base segment 400 about the pivot 408. Rotation of the extended segment 402 relative to the base segment 400 adjusts the trigger 354 between the closed configuration and the extended configuration. As an example, rotation of the extended segment 402 in the first rotational direction 364 about the pivot 408 (e.g., toward the grip portion 360 of the handle 350) causes the extended segment 402 to move away from the base segment 400, transitioning the trigger 354 to the extended configuration. Rotation of the extended segment 402 in the second rotational direction 366 about the pivot 408 (e.g., toward the base portion 362 of the handle 350) causes the extended segment 402 to move toward the base segment 400, potentially transitioning the trigger 354 to the compact configuration. The user can manually move the extended segment 402 relative to the base segment 400 to adjust the configuration of the trigger 354.

In the extended configuration of the trigger 354, the user may impart a force onto the extended segment 402 toward the handle 350 to cause the base segment 400 to rotate in the first rotational direction 364. Additionally, the user may impart a force onto the base segment 400 toward the handle 350 to cause the base segment 400 to rotate in the first rotational direction 364. That is, the user may utilize (e.g., press, squeeze) either the base segment 400 or the extended segment 402 to actuate the trigger 354. To this end, the trigger 354 (e.g., the base segment 400, the extended segment 402) may include a stop (not shown) that blocks rotation of the extended segment 402 in the first rotational direction 364 relative to the base segment 400 beyond a certain amount. As an example, the stop may block rotation of the extended segment 402 beyond a threshold angle (e.g., 180 degrees) relative to the base segment 400 to retain a particular orientation (e.g., a parallel orientation) between the base segment 400 and the extended segment 402 in the extended configuration. Thus, an additional force imparted onto the extended segment 402 toward the handle 350 causes each of the base segment 400 and the extended segment 402 to rotate in the first rotational direction 364 relative to the handle 350, thereby actuating the trigger 354, instead of causing further rotation of the extended segment 402 in the first rotational direction 364 relative to the base segment 400.

It should be noted that although the disclosure primarily discusses rotation of the extended segment 402 relative to the base segment 400, the extended segment 402 may move relative to the base segment 400 in any other suitable manner to adjust the trigger 354 between the compact configuration and the extended configuration. For instance, the extended segment 402 may slide or translate relative to the base segment 400 (e.g., via a telescope mechanism) in an additional or alternative embodiment. Additionally, although the disclosure primarily discusses movement of the base segment 400 and the extended segment 402 relative to one another to transition the trigger 354 between two configurations, the base segment 400 and the extended segment 402 may be reoriented with respect to one another to establish an additional configuration of the trigger 354. For example, the base segment 400 and the extended segment 402 may be oriented crosswise (e.g., at a perpendicular angle) relative to one another in an intermediate configuration between the extended configuration and the compact configuration of the trigger 354.

Figure 3A:
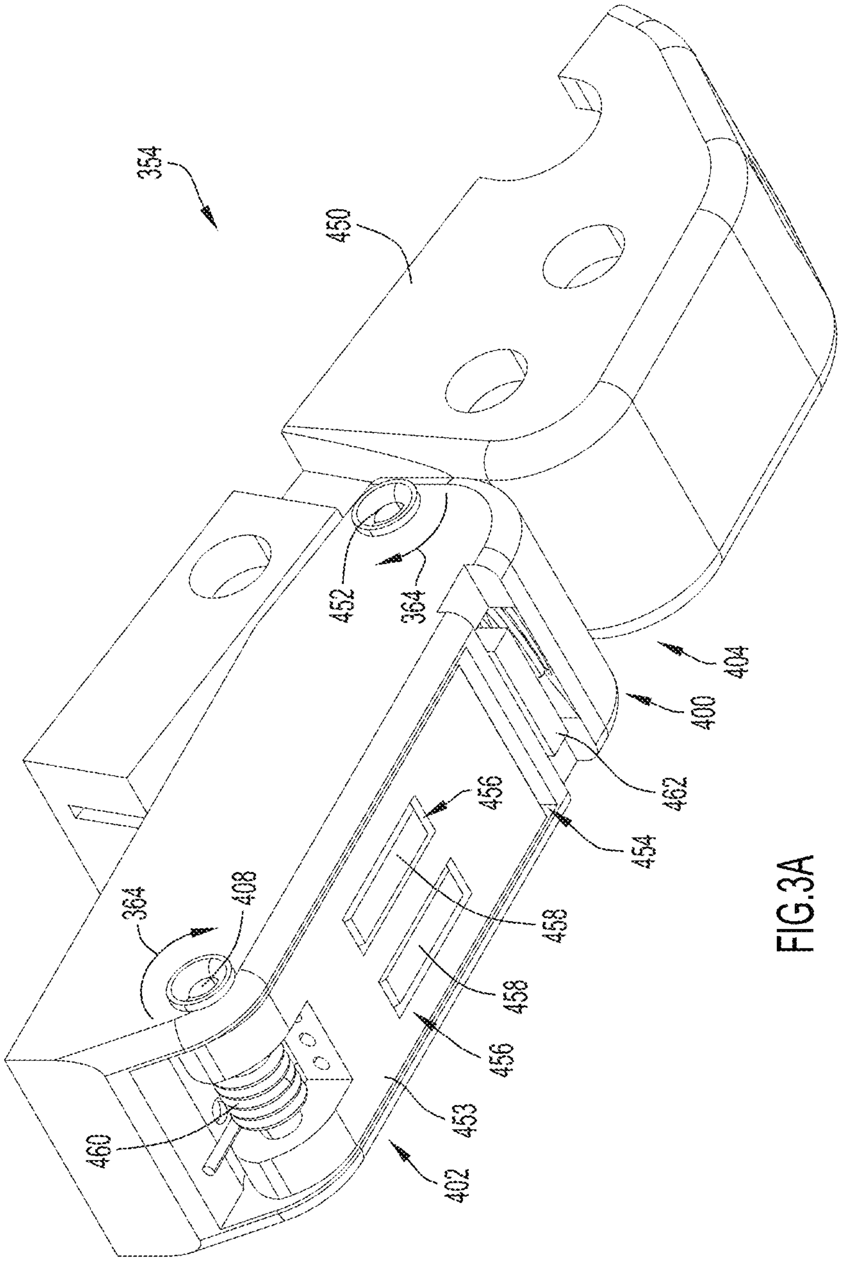
FIG. 3A is a perspective view of a trigger of a torch in a compact configuration, according to one or more embodiments.

FIG. 3A is a perspective view of the trigger 354 in the compact configuration. The illustrated trigger 354 includes a mount 450 configured to couple to the handle 350 (e.g., to the base portion 362). In certain embodiments, the mount 450 is detachable from the handle 350. For example, the mount 450 is coupled to the handle 350 via a fastener and/or an interference fit, which may enable the mount 450 to be easily decoupled (e.g., via a manually applied force) from the handle 350. Thus, the trigger 354 might not be integral to the handle 350. As such, the trigger 354 can be separated from the handle 350 without modifying a remainder of the torch 16, such as for replacement, inspection, modification, and/or maintenance of the trigger 354, thereby improving an case of performing service for the torch 16. The base segment 400 (e.g., the first end 404) of the trigger 354 is coupled to the mount 450 at a pivot 452. The base segment 400 may rotate relative to the mount 450 via the pivot 452 while the mount 450 remains fixed with respect to the handle 350. Therefore, rotation of the base segment 400 relative to the mount 450 may cause rotation of the base segment 400 relative to the handle 350.

In the compact configuration, the extended segment 402 extends along the base segment 400. Thus, a first surface 453 of the extended segment 402 faces away from the handle 350 in the compact configuration, and the first surface 453 is depressible by the user to rotate the base segment 400 in the first rotational direction 364 about the pivot 452 to actuate the trigger 354. More specifically, in the depicted embodiment, the base segment 400 defines a receptacle 454 configured to receive the extended segment 402 in the compact configuration. Additionally, the extended segment 402 defines channels 456 configured to receive protrusions 458 of the base segment 400 in the compact configuration. That is, extension of the extended segment 402 within the receptacle 454 also cause the protrusions 458 to extend into the channels 456. A portion of the protrusions 458 may be exposed via the channels 456 to enable the user to contact the protrusions 458 to rotate the base segment 400 in the first rotational direction 364 about the pivot 452 to actuate the trigger 354. Accordingly, the extended segment 402 may be securely coupled to—and able to move with—the base segment 400 in the compact configuration. However, in other embodiments, the base segment 400 can be removably connected to the extended segment 402 in any desirable manner (e.g., via detent connections, press fit, and/or protrusions that extend partially into, but not through, extended segment 402)

The trigger 354 further includes a biasing member 460 (e.g., a torsion spring) configured to impart a force onto the extended segment 402 to urge movement of the extended segment 402 away from the base segment 400 (e.g., out of the receptacle 454). For this reason, the trigger 354 includes a latch 462 to retain the trigger 354 in the compact configuration. The latch 462 is configured to engage the extended segment 402 and retain the extended segment 402 within the receptacle 454. The latch 462 may be actuated by a user to disengage from the extended segment 402. Disengagement between the latch 462 and the extended segment 402 enables the biasing member 460 to rotate the extended segment 402 in the first rotational direction 364 about the pivot 408 and away from the base segment 400 to transition the trigger 354 to the extended configuration. Thus, the user may utilize the latch 462 to selectively adjust the trigger 354 between the compact configuration and the extended configuration.

Figure 3B:
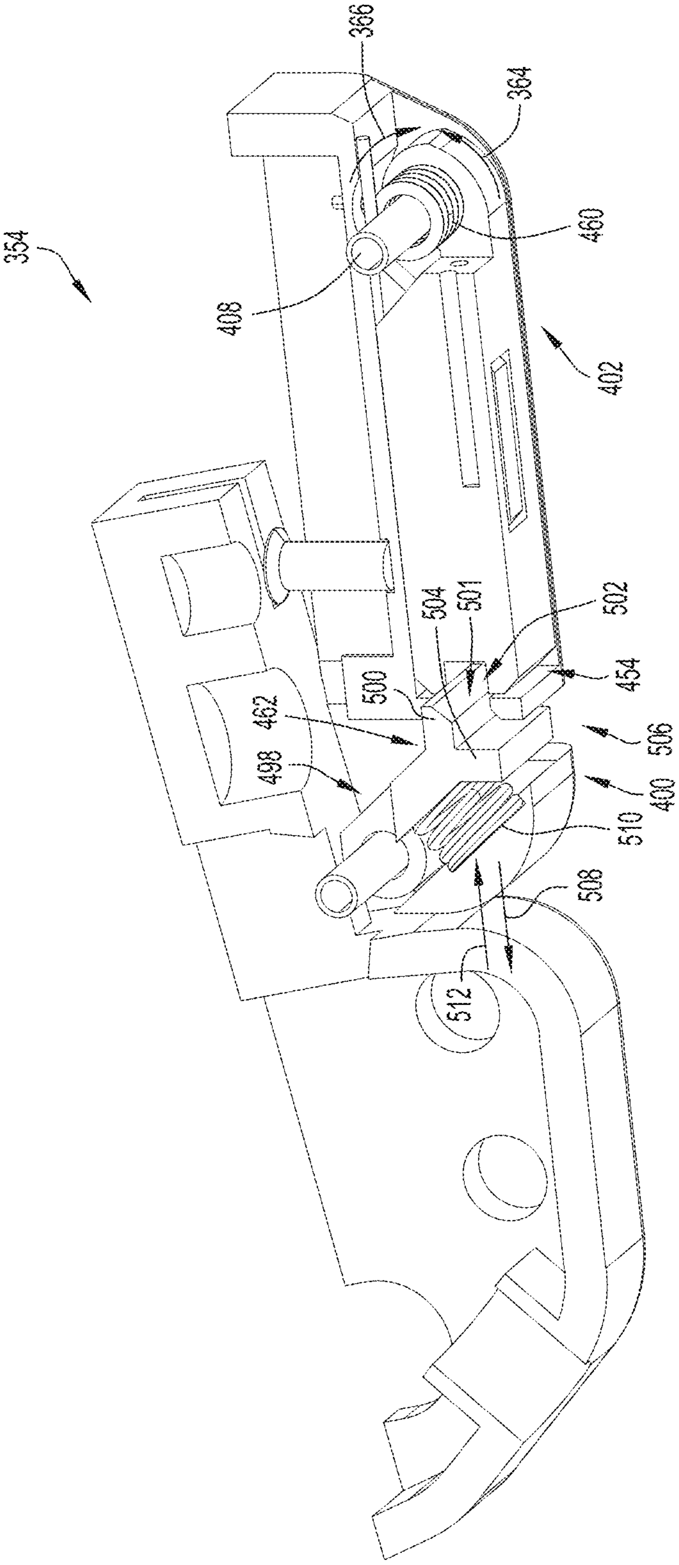
FIG. 3B is a cross-sectional view of the trigger of FIG. 3A in a compact configuration, according to one or more embodiments.

FIG. 3B is a cross-sectional view of the trigger 354 in the compact configuration in which the extended segment 402 is positioned within the receptacle 454 of the base segment 400. The latch 462 is positioned within a cavity 498 defined by the base segment 400 and engages with the extended segment 402 to retain the extended segment 402 in the receptacle 454, thereby retaining the trigger 354 in the compact configuration. In the depicted embodiment, the latch 462 includes an extension 500 configured to extend into the receptacle 454 (e.g., via a slot 501 defined by the base segment 400). The extended segment 402 defines a recess 502 in which the extension 500 is positioned in the compact configuration. Thus, the extended segment 402 captures the extension 500 of the latch 462 via the recess 502 in the compact configuration. That is, the extension 500 abuts against the extended segment 402 defining the recess 502 to block movement of the extended segment 402 away from the base segment 400 in the first rotational direction 364.

The latch 462 is actuatable to disengage the extension 500 from the extended segment 402. Thus, in the depicted embodiment, the latch 462 includes a projection 504 extending within the cavity 498 and external to (e.g., alongside) the receptacle 454, and the base segment 400 defines an opening 506 that exposes the projection 504. The opening 506 allows a user to access the projection 504. For example, the user may impart a force onto the projection 504 to move the latch 462 in a first translational direction 508 away from the receptacle 454. Movement of the latch 462 in the first translational direction 508 may move the extension 500 out of the receptacle 454 and out of the recess 502 of the extension 500. Then, the latch 462 will no longer be in engagement with the extended segment 402, and the biasing member 460 will be able to move the extended segment 402 about the pivot 408 in the first rotational direction 364 away from the base segment 400. However, in other embodiments, the latch 462 can move in any desirable direction to unlock the extended segment 402 for movement about pivot 408.

Furthermore, the latch 462 is coupled to the base segment 400 via a biasing member 510 (e.g., an axial spring, a compression spring). The biasing member 510 is configured to bias the latch 462 in a second translational direction 512, opposite the first translational direction 508, toward the receptacle 454. Thus, absent a force imparted onto the latch 462 (e.g., by the user via the projection 504), the extension 500 may extend into the receptacle 454. In this manner, the biasing member 510 may cause the latch 462 to maintain engagement with the extended segment 402 via the extension 500 to retain the trigger 354 in the compact configuration. However, in other embodiments, the latch 462 need not be biased and can retain the extended segment 402 in the compact configuration in any manner (e.g., in response to a second user actuation).

Figure 3C:
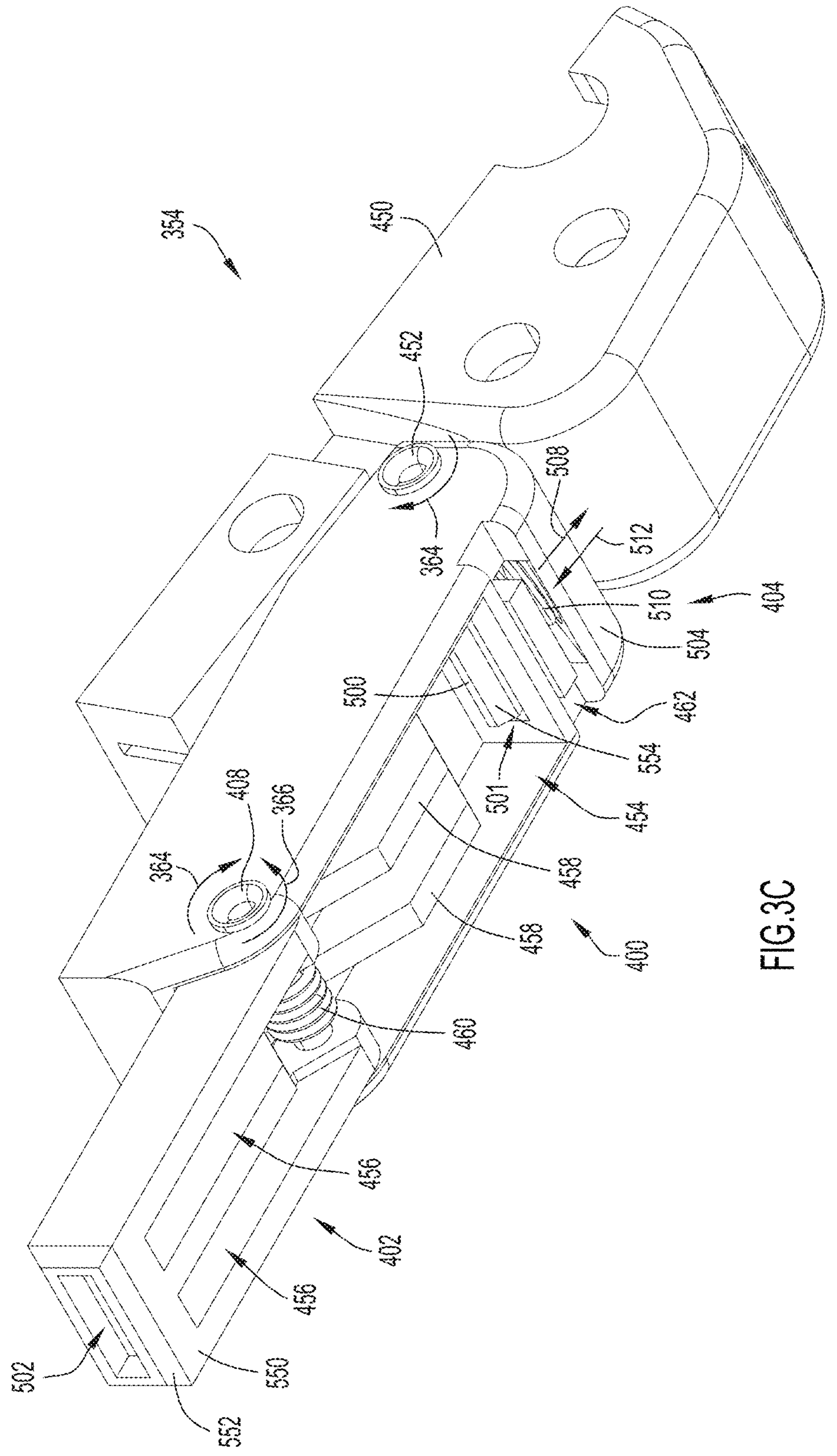
FIG. 3C is a perspective view of the trigger of FIG. 3A in an extended configuration, according to one or more embodiments.

FIG. 3C is a perspective view of an embodiment of the trigger 354 in the extended configuration. For instance, the latch 462 may be moved in the first translational direction 508 to disengage the extension 500 from the extended segment 402. As a result, the biasing member 460 biases the extended segment 402 to move about the pivot 408 in the first rotational direction 364. In other embodiments, a biasing member may bias the extended segment 402 in the first rotational direction 364, and a latch may engage the extended segment 402 to retain the trigger 354 in the extended configuration. In other words, a force (e.g., a manually applied force) that overcomes the force applied by the biasing member may move the extended segment 402 to cause the trigger 354 to transition toward the extended configuration and to cause the extended segment 402 to engage the latch, and the latch may be manually actuated to release the extended segment 402 and cause the trigger 354 to transition toward the compact configuration.

In the extended configuration, a second surface 550 of the extended segment 402 faces away from the handle 350 (e.g., the first surface 453 faces toward the handle 350). Thus, the second surface 550 is depressible by the user to rotate the base segment 400 in the first rotational direction 364 about the pivot 452 to actuate the trigger 354. Additionally, the protrusions 458 of the base segment 400 are exposed within the receptacle 454 in the extended configuration. Thus, the protrusions 458 remain depressible by the user to rotate the base segment 400 in the first rotational direction 364 about the pivot 452 to actuate the trigger 354. In this way, a relatively greater surface area of the trigger 354 may be accessible to the user to actuate the trigger 354. For example, the user may be able to position two fingers (e.g., one finger on the base segment 400, one finger on the extended segment 402) on the trigger 354 in the extended configuration to actuate the trigger 354.

In some embodiments, the extended segment 402 and/or the base segment 400 may include different tactile features to provide tactile feedback to the user to help the user distinguish between different components of the torch 16. As an example, the first surface 453 may have a first tactile feature, the second surface 550 may have a second tactile feature, and the protrusions 458 may have a third tactile feature. Such tactile features may include different textures (e.g., stippling, honeycomb, granulated, no texture), different materials (e.g., rubber, metal, composite), or any other suitable feature that may provide a different physical perception. As such, the user can determine what component is being touched based on the tactile features, and the user can adjust their grip or hand position accordingly.

The extended segment 402 and the latch 462 may further include features to facilitate movement of the extension 500 into the recess 502 to transition the trigger 354 to the compact configuration. By way of example, the extended segment 402 may include a first angled surface 552 (e.g., extending at an oblique angle with respect to the first surface 453), and the extension 500 may include a second angled surface 554 (e.g., extending at an oblique angle with respect to a surface of the extension 500 that abuts against the extended segment 402 in the compact configuration). Engagement between the first angled surface 552 and the second angled surface 554 (e.g., during rotation of the extended segment 402 in the second rotational direction 366) may drive movement of the latch 462 in the first translational direction 508. That is, because of the angled orientation of the first angled surface 552 and of the second angled surface 554, imparting a force onto the extended segment 402 while the first angled surface 552 and the second angled surface 554 abut one another may cause the first angled surface 552 and the second angled surface 554 to slide along one another, thereby driving the latch 462 to move in the first translational direction 508.

Movement of the latch 462 in the first translational direction 508 moves the extension 500 out of the receptacle 454 to enable the extended segment 402 to be fully positioned within the receptacle 454 and to align the recess 502 of the extended segment 402 with the extension 500. The alignment of the extension 500 with the recess 502 may then enable the biasing member 510 to move the latch 462 in the second translational direction 512 to move the extension 500 within the recess 502, thereby causing the extension 500 to engage the extended segment 402 and retain the trigger 354 in the compact configuration. As such, the angled surfaces 552, 554 may enable the user to transition the trigger 354 to the compact configuration without having to use the projection 504 to move the latch 462 in the first translational direction 508, thereby facilitating adjustment of the trigger 354 to the compact configuration.

Figure 4:
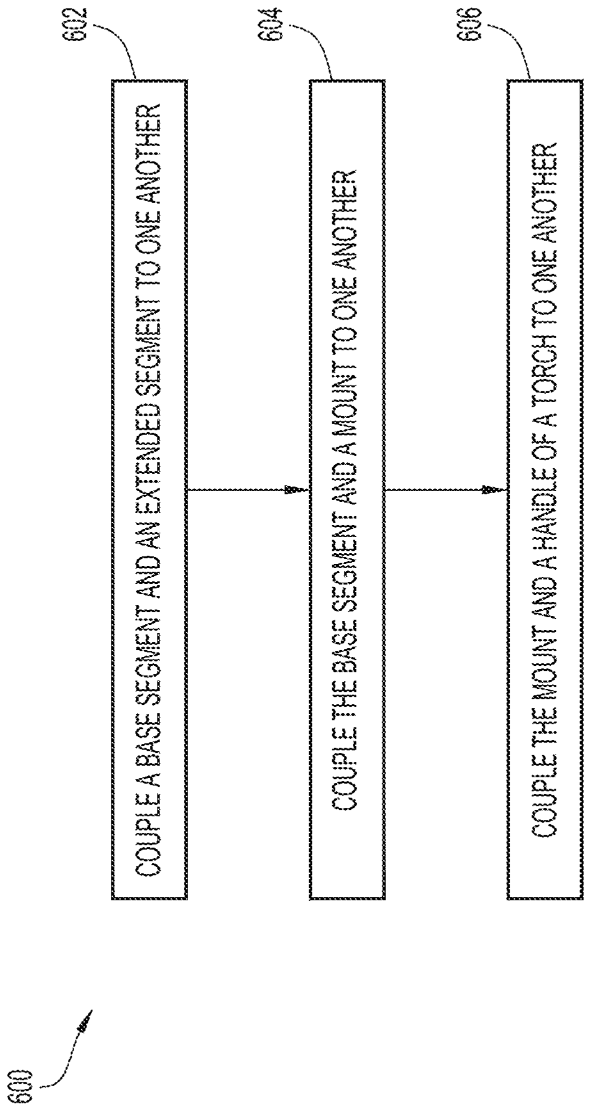
FIG. 4 is a flowchart of a method of manufacture of a trigger for a torch, according to one or more embodiments.

FIG. 4 is a flowchart of a method 600 of manufacture of the trigger 354. As an example, a user may manually perform one or more the operations of the method 600. As another example, machinery may automatically perform one or more the operations of the method 600. Indeed, the method 600 may be performed by any suitable number of different entities. It should be noted that the operations of the depicted method 600 may be performed differently in additional or alternative embodiments. For instance, an additional operation may be performed, a depicted operation may be removed, and/or the operations may be performed in a different order.

At block 602, the base segment 400 and the extended segment 402 are coupled to one another, such as at the pivot 408. Thus, the base segment 400 and the extended segment 402 may rotate relative to one another via the pivot 408. At block 604, the base segment 400 and the mount 450 are coupled to one another, such as at the pivot 452. As such, the base segment 400 and the mount 450 may rotate relative to one another via the pivot 452. Coupling of the base segment 400, the extended segment 402, and the mount 450 to one another may provide the trigger 354. At block 606, the mount 450 and the handle 350 of the torch 16 are coupled to one another. As such, the trigger 354 is implemented in the torch 16 and may be actuated to operate the torch 16. For example, the mount 450 may be fixed to the handle 350, and the base segment 400 may be depressible relative to the handle 350 to operate the torch 16.

In some embodiments, the trigger 354 may be similarly removed from the torch 16. For example, the mount 450 may be decoupled from the handle 350 to remove each of the mount 450, the base segment 400, and the extended segment 402 from the torch 16. As such, an entirety of the trigger 354 may be easily removed from the torch 16, such as without having to modify other components of the torch 16.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

While the disclosure has been illustrated and described in detail and with reference to specific embodiments thereof, it is nevertheless not intended to be limited to the details shown, since it will be apparent that various modifications and structural changes may be made therein without departing from the scope of the disclosure and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

For example, although several features and advantages are described above in connection with a mount, these features and advantages would also be applicable if the trigger described herein was coupled in a different manner to the handle, such as with the base segment coupled directly to the handle.

Reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as “above,” “below,” “upper,” “lower,” “top,” “bottom,” or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions and/or other characteristics (e.g., time, pressure, temperature, distance, etc.) of an element, operations, conditions, etc., the phrase “between X and Y” represents a range that includes X and Y.

For example, it is to be understood that terms such as “left,” “right,” “top,” “bottom,” “front,” “rear,” “side,” “height,” “length,” “width,” “upper,” “lower,” “interior,”

"exterior," "inner," "outer" and the like as may be used herein, merely describe points of reference and do not limit the present disclosure to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment.

Further, the present disclosure may repeat reference numerals and/or letters in the various examples. This repetition is for the purpose of simplicity and clarity and does not in itself dictate a relationship between the various embodiments and/or configurations discussed.

Similarly, when used herein, the term "comprises" and its derivations (such as "comprising") should not be understood in an excluding sense, that is, these terms should not be interpreted as excluding the possibility that what is described and defined may include further elements, steps, etc. Meanwhile, when used herein, the term "approximately" and terms of its family (such as "approximate") should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

As used herein, unless expressly stated to the contrary, use of the phrase "at least one of," "one or more of," "and/or," variations thereof, or the like are open-ended expressions that are both conjunctive and disjunctive in operation for any and all possible combination of the associated listed items. For example, each of the expressions "at least one of X, Y and Z," "at least one of X. Y or Z," "one or more of X, Y and Z," "one or more of X, Y or Z" and "X, Y and/or Z" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms "first," "second," "third," etc., are intended to distinguish the particular nouns they modify (e.g., element, condition, node, outlet, inlet, valve, module, activity, operation). Unless expressly stated to the contrary, the use of these terms is not intended to indicate any type of order, rank, importance, temporal sequence, or hierarchy of the modified noun. For example, "first X" and "second X" are intended to designate two "X" elements that are not necessarily limited by any order, rank, importance, temporal sequence, or hierarchy of the two elements. Further as referred to herein, "at least one of" and "one or more of" can be represented using the "(s)" nomenclature (e.g., one or more element(s)).

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A torch for an arc process operation, comprising:

a handle; and a trigger coupled to the handle, wherein the trigger comprises:

a base segment configured to rotate relative to the handle via a pivot; and an extended segment coupled to the base segment, wherein the extended segment is configured to move relative to the base segment to transition the trigger between an extended configuration and a compact configuration, the extended segment extends away from the base segment in the extended configuration, and the extended segment extends along the base segment in the compact configuration, wherein the trigger is configured to be actuated in the compact configuration and in the extended configuration.

2. The torch of claim 1, comprising a biasing member configured to bias the extended segment away from the base segment to urge the trigger toward the extended configuration.

3. The torch of claim 2, comprising a latch coupled to the base segment, the extended segment being configured to engage the latch in the compact configuration of the trigger, and the latch, in the compact configuration, being configured to block movement of the extended segment away from the base segment.

4. The torch of claim 3, wherein the latch is movable to disengage from the extended segment to enable movement of the extended segment away from the base segment.

5. The torch of claim 1, wherein the extended segment is coupled to the base segment at an additional pivot, and the extended segment is configured to rotate relative to the base segment via the additional pivot to move relative to the base segment.

6. The torch of claim 1, wherein the base segment comprises a receptacle, and the extended segment is configured to extend into the receptacle in the compact configuration of the trigger.

7. The torch of claim 6, wherein the base segment comprises a protrusion disposed within the receptacle, and the extended segment defines a channel configured to receive the protrusion in the compact configuration of the trigger.

8. The torch of claim 1, wherein the extended segment comprises a first surface and a second surface positioned at opposite sides of the extended segment, the first surface is depressible in the extended configuration of the trigger to rotate the base segment toward the handle, and the second surface is depressible in the compact configuration of the trigger to rotate the base segment toward the handle.

9. A trigger for an arc process torch, comprising:

a first segment configured to rotate relative to a handle of the arc process torch;

a second segment coupled to the first segment and configured to move relative to the first segment, wherein the second segment is configured to extend along the first segment in a first configuration of the trigger, and the second segment is configured to extend away from the first segment in a second configuration of the trigger; and a mount configured to couple to the handle, wherein the first segment is coupled to the mount and is configured to rotate relative to the mount to rotate relative to the handle.

10. The trigger of claim 9, wherein the second segment comprises a first surface and a second surface disposed at opposite sides of the second segment, the first surface faces away from the handle in the first configuration, and the second surface faces away from the handle in the second configuration.

11. The trigger of claim 9, wherein the first segment is configured to rotate relative to the handle while the trigger is in the first configuration and while the trigger is in the second configuration.

12. The trigger of claim 9, comprising a latch coupled to the first segment, wherein the latch is configured to engage the second segment to retain the trigger in the first configuration.

13. The trigger of claim 12, wherein the second segment is configured to rotate to extend away from the first segment, the second segment defines a recess, and the latch is configured to extend into the recess to engage the second segment and block rotation of the second segment away from the first segment to retain the trigger in the first configuration.

14. The trigger of claim 13, wherein the first segment defines a receptacle, the second segment is positioned within the receptacle in the first configuration, the latch comprises an extension, and the trigger comprises a biasing member configured to bias the latch toward the receptacle to extend the extension into the receptacle of the first segment and into the recess of the second segment positioned within the receptacle.

15. The trigger of claim 12, comprising a biasing member configured to bias the second segment away from the first segment to transition the trigger to the second configuration absent engagement of the latch with the second segment.

16. A handheld tool configured to perform a processing operation, comprising:

a handle comprising a base portion and a grip portion; and a trigger coupled to the base portion of the handle, wherein the trigger comprises a first segment and a second segment configured to rotate relative to one another, the first segment and the second segment extend along one another in a first configuration of the trigger, the first segment and the second segment extend away from one another in a second configuration of the trigger, the second segment extends over the grip portion in the second configuration of the trigger, and actuation of the trigger causes the handheld tool to perform the processing operation.

17. The handheld tool of claim 16, wherein the second segment is configured to be rotated toward the grip portion in the second configuration of the trigger to actuate the trigger.

18. The handheld tool of claim 16, wherein the second segment is configured to rotate relative to the first segment in a first rotational direction toward the base portion of the handle to transition the trigger to the first configuration, and the second segment is configured to rotate relative to the first segment in a second rotational direction toward the grip portion to transition the trigger to the second configuration.

19. The handheld tool of claim 16, wherein the second segment extends collinear to the first segment in the second configuration of the trigger.

20. The handheld tool of claim 16, wherein the first segment defines a receptacle, the receptacle receives the second segment in the first configuration of the trigger, and the receptacle is exposed in the second configuration of the trigger.

* * * * *